United States Patent
Nordström et al.

(10) Patent No.: US 11,489,477 B2
(45) Date of Patent: Nov. 1, 2022

(54) SEMI-SYMMETRIC SWITCHING

(71) Applicant: Mirka Oy, Jeppo (FI)

(72) Inventors: Caj Nordström, Jeppo (FI); Tomas Södergård, Nykarleby (FI)

(73) Assignee: Mirka Oy, Jeppo (FI)

( * ) Notice: Subject to any disclaimer, the term of this patent is extended or adjusted under 35 U.S.C. 154(b) by 0 days.

(21) Appl. No.: 16/973,919

(22) PCT Filed: Jun. 15, 2018

(86) PCT No.: PCT/EP2018/065972
§ 371 (c)(1),
(2) Date: Dec. 10, 2020

(87) PCT Pub. No.: WO2019/238243
PCT Pub. Date: Dec. 19, 2019

(65) Prior Publication Data
US 2021/0203264 A1 Jul. 1, 2021

(51) Int. Cl.
*H02P 1/00* (2006.01)
*H02P 27/08* (2006.01)
*H02P 6/08* (2016.01)

(52) U.S. Cl.
CPC ............ *H02P 27/085* (2013.01); *H02P 6/085* (2013.01); *H02P 2207/05* (2013.01)

(58) Field of Classification Search
CPC .... H02P 27/085; H02P 6/085; H02P 2207/05; H02P 23/00; H02P 1/0128
See application file for complete search history.

(56) References Cited

U.S. PATENT DOCUMENTS

| | | | |
|---|---|---|---|
| 2014/0015451 A1* | 1/2014 | Funabashi | H02P 1/028 318/139 |
| 2014/0042839 A1* | 2/2014 | Horie | H02P 23/00 363/16 |

(Continued)

FOREIGN PATENT DOCUMENTS

EP 2674256 A2 12/2013

OTHER PUBLICATIONS

International Preliminary Report on Patentability for International Application No. PCT/EP2018/065972 dated Dec. 24, 2020.

(Continued)

*Primary Examiner* — Cortez M Cook
(74) *Attorney, Agent, or Firm* — Wolf, Greenfield & Sacks, P.C.

(57) ABSTRACT

A power tool with a direct current, DC, power source comprising a controller for controlling a driver circuit driving a brushless motor in a power tool, the driver circuit being coupled to a direct current, DC, power source and including a first switching element pair coupled to a first phase winding of the brushless motor and a second switching element pair coupled to a second phase winding of the brushless motor; and the controller being arranged to alternately switch a first switching element of the first switching element pair and a second switching element of the second switching element pair, wherein the first switching element and the second switching elements are coupled to a respective terminal of the DC power source. A power tool comprising such a controller, and a method of controlling a driver circuit driving a brushless motor in a power tool.

11 Claims, 9 Drawing Sheets

(56) References Cited

U.S. PATENT DOCUMENTS

2015/0188465 A1   7/2015  Soh
2017/0093321 A1   3/2017  Ichikawa

OTHER PUBLICATIONS

International Search Report and Written Opinion for International Application No. PCT/EP2018/065972 dated Mar. 7, 2019.

* cited by examiner

| Rotor angle θ | 0 | 30 | 60 | 90 | 120 |
|---|---|---|---|---|---|
| Alignment of phase windings and rotor pole-pair | 82 - N | 86 - S | 84 - N | 82 - S | 86 - N |
| Phase windings being powered | | 84, 86 | 82, 84 | 82, 86 | 84, 86 |

SEMI-SYMMETRIC SWITCHING

CROSS REFERENCE TO RELATED APPLICATIONS

This Application is a national stage filing under 35 U.S.C. 371 of International Patent Application Serial No. PCT/EP2018/065972, filed Jun. 15, 2018, entitled "SEMI-SYMMETRIC SWITCHING", the content of which is incorporated herein by reference in its entirety.

TECHNICAL FIELD

The present disclosure generally relates to electric motor control, and more particularly to a power tool, a controller for controlling a driver circuit used to drive an electric motor, a method of controlling a driver circuit, a computer program and a non-transitory storage medium.

BACKGROUND ART

Many powered devices, that is, devices being supplied with electric power to operate, use electric motors to function. Powered devices are advantageous because they rely on power supplied by an electric source, either alternating current (AC) or direct current (DC), which is easily generated and controllable.

In powered devices, the operation of an electric motor is controlled by regulating the amount of electric power supplied to the motor. More specifically, the current flowing through the motor phase windings is controlled to generate a rotating electromagnetic field, which causes the rotor of the motor to rotate.

For electronically commutated electric motors, a driver circuit having switching elements is used to control the supply of electric current to each phase winding of the motor. Brushless motors are a known type of electric motors which may be electronically commutated using a power source (e.g. a DC or AC power source) and which do not require electric power to be supplied to the rotor. Types of brushless motors includes Brushless DC motors (BLDC) having a permanent magnet rotor, Switched Reluctance motors (SRM) etc.

Switching elements are electronic components that can selectively allow electric current to flow. In the present disclosure, a switching element will generally be defined to be ON when it allows electric current flow, and OFF when it does not.

A common configuration for driver circuits used with brushless motors is called a bridge configuration (also called Half bridge). Pairs of switching elements which are connected in series are connected to the terminals of the power source, the pairs being connected in parallel to each other, and the common node of the switching elements in each switching elements pairs is connected to a respective one of the phase windings of the motor.

Figure 1:
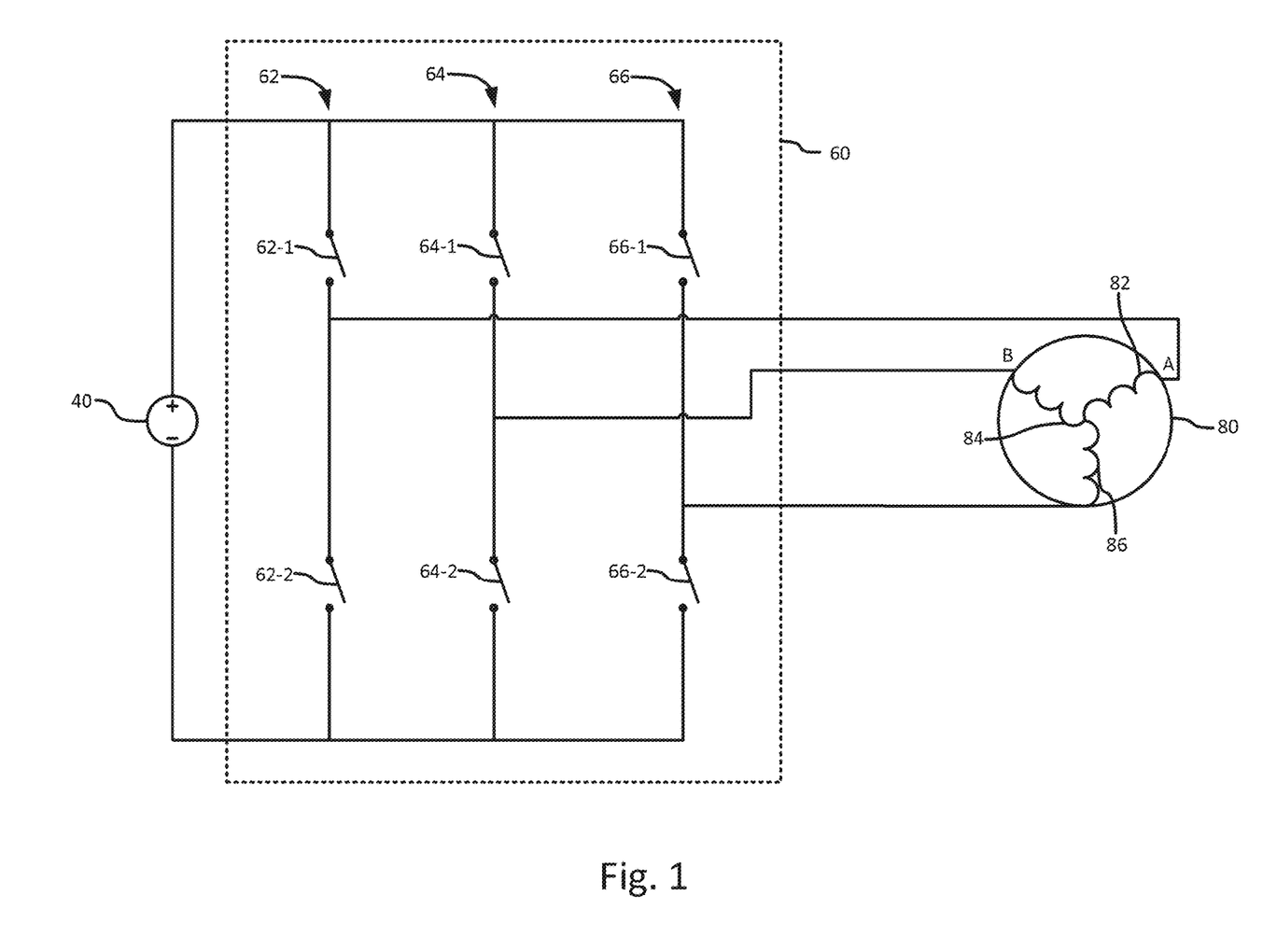
FIG. 1 shows a schematic view of a bridge configuration driver circuit coupled to a DC power source and a brushless motor having three phase windings.

FIG. 1 shows a conventional bridge configuration driver circuit 60 connected to a DC power source 40 on one side, and a motor 80 on the other side.

In driver circuits having a bridge configuration, electric current is provided to a phase winding of the motor by switching ON two switching elements in different pairs, each switching element being connected to opposite terminals of the DC power source (either the '+' or '−' terminal). This creates a series connection between the first switching element, the phase winding of the motor and the second switching element, allowing electric current to flow between the DC power source terminals through the phase winding of the motor. The desired current level in a phase winding is achieved by controlling the amount of time current is allowed to flow through the phase winding, typically by driving one or both of the switching element with a pulse-width modulation, PWM, signal, that is, a pulsing signal whose pulse width may be controlled.

A known control method used with half-bridge driver circuits is asymmetric switching, in which a switching element connected to one of the power source terminals (e.g. the '+' terminal) is kept ON during a commutation period, and another switching element from another pair connected to the other power source terminal is driven by a PWM signal during the commutation period, to regulate the current supplied to the phase windings. The switching element of each pair connected to the same power source terminal is kept ON in succession, each during a respective commutation period of the motor.

However, asymmetric switching causes the switching element driven by the PWM signal to be excessively affected, because it suffers from larger switching losses, and consequently from a higher temperature increase than the other switching element in the pair. This may lead to the switching elements to deteriorate at different rates, or differ in their performance. Additionally, conduction losses in the switching elements and its diode or body diode are also unequally affected.

Another known control method is symmetric switching, in which the involved switching elements are switched simultaneously. That is, both switching elements are ON simultaneously and likewise OFF.

However, symmetric switching requires both switching elements to be repeatedly switched ON and OFF, leading to a higher total power loss and therefore a significantly reduced overall efficiency which is undesirable.

There is therefore a need for an electric motor control allowing for the power losses to be more evenly distributed on switching elements in an half bridge driver circuit whilst achieving a desirable overall efficiency level.

At the same time, powered devices emit electromagnetic energy when operating, which can negatively affect surrounding equipment, by causing electromagnetic interference, for example. Extensive testing must therefore be carried out to ensure that the level of energy emitted by a powered device does not exceed an acceptable threshold (i.e. that the powered device has electromagnetic compatibility), such as thresholds defined in standards developed by various international bodies. For example, European standard EN 55014 defines the electromagnetic compatibility requirements for household appliances, electric tools and similar apparatus.

A factor affecting the electromagnetic energy emitted by powered devices is the frequency of electric signals in the powered devices including the harmonic components caused by switching ON or OFF the elements in the device.

It is therefore desirable to regulate the emitted electromagnetic energy to be lower than a predefined threshold.

SUMMARY

Embodiments of the present invention have been devised which address at least some of the above-identified problems.

In a first aspect, there is provided a power tool with a direct current (DC) power source (for example a constant DC power source or pulsating DC power source), a driver circuit and a brushless motor. The power tool comprises a controller arranged to alternately switch a first and a second switching elements that are part of the driver circuit and that are coupled to respective terminals of the DC power source and coupled to respective phase windings of a brushless motor.

The power tool has a DC power source which is coupled to the driver circuit. The power source may be an independent DC power source, such as an internal DC battery, or may be a dependent power source drawing power from an external AC or DC power source, for example if the power tool is connected to an AC power plug (in which case the AC power is converted into DC power to form the DC power source).

The controller may receive information about a desired operation of the motor including a desired rotation speed, torque and/or other characteristics known to a skilled person, for example if a user actions a switch provided on the power tool causing a signal to be transmitted to the controller, and the controller may generate one or more control signals for controlling the state of the switching elements accordingly.

More specifically, the controller is coupled to each switching elements of the driver circuit (for example, by way of an electric connection to the gate or the base of a transistor), so as to controllably form electric paths through the switching elements.

When an electric path is formed between the terminals of the DC power source through switching elements which are ON, a voltage is obtained between separate points on phase windings of the brushless motor. The obtained voltage leads to a current flowing through the switching elements which are ON and the phase windings between these points, which, in turn, leads to a magnetic field being generated in the motor. The generated magnetic field interacts with the rotor (for example with a magnetic field generated by permanent magnets on the rotor), causing the rotor to operate as desired.

With the above power tool comprising the controller, the first and second switching elements are not switched at the same time, therefore the switching losses occurring in each switching element are limited, and the efficiency of the system is maintained when compared, for example, to an asymmetric switching scheme, or even improved when compared, for example, to a symmetric switching scheme.

Additionally, because the switching elements are switched alternately, or in turn, the switching losses are distributed between the switching elements.

Accordingly, the above controller allows for the power losses to be distributed on switching elements in a half bridge driver circuit and for a desirable overall efficiency to be achieved.

In an embodiment, the controller is arranged to alternately switch a first switching element which is in a first switching element pair and coupled to a first phase winding of the brushless motor, and a second switching element which is in a second switching element pair and coupled to a second phase winding of the brushless motor, during a same switching period.

At least one of the switching elements is driven by a pulsing signal to regulate the current in phase windings. The frequency of the pulsing signal may be defined as a switching frequency ($f\_sw$), and the corresponding period ($1/f\_sw$) as a switching period ($p\_sw$). In pulse-width modulation, the pulse signal is high for a part of the switching period, generally defined as the duty cycle and expressed in terms of percentage. For example, a duty cycle of 50% means the switching element is controlled to be ON for half of the switching period and OFF for the other half.

In this embodiment, because the first and second switching elements are alternately switched during a same switching period, the effective switching frequency of each switching element is reduced.

More specifically, this allows for the first and second switching elements to be switched only once per switching period (either OFF to ON, or OFF to ON), while obtaining the desired current level in the phase windings.

Consequently, the effective switching frequency of each switching element is substantially halved, and the effect of the switching elements on the emitted energy occurs at a much lower frequency, thereby reducing the level of energy emitted by the system at higher frequencies.

In another embodiment, the controller is arranged to keep a first switching element ON during a first commutation step of the brushless motor and control a second switching element with a pulsing signal (for example a pulse-width modulation, PWM, signal), and to keep the second switching element ON during a second commutation step of the brushless motor and control the first switching element with a pulsing signal. In this embodiment, the first switching element is in a first switching element pair and coupled to a first phase winding of the brushless motor, and the second switching element is in a second switching element pair and coupled to a second phase winding of the brushless motor.

When considering both the first and second commutation periods, the switching losses are distributed between the two switching elements, such that neither switching element is disproportionately affected.

The first switching element is switched ON and OFF at each switching period during the first commutation period, and the second switching element is switched ON and OFF at each switching period during the second commutation period. Consequently, switching the switching elements cause more energy to be emitted at higher frequencies than in some of the previously described embodiments.

As the total energy emitted depends on other components of the system as well, this may be preferable in some situations.

In an embodiment, the controller is arranged to control the switching elements in at least one of the switching element pairs synchronously.

In other words, the switching elements within the same pair (e.g 66) which are synchronously driven are driven by opposite PWM signals (with the required dead time being inserted), such that one is switched ON as the other one is switched OFF and that at any given time, exactly one of the switching elements in the pair is ON (except during a dead time, in which case both switching elements are OFF). The dead time would be understood by a skilled person to be a period between the moment one the switching elements in a pair is turned off and the moment the other switching element in the pair is turned on, to take into account to account the switching elements' fall time and avoid causing a short-circuit between the terminals of the DC power source.

For a MOSFET the conduction losses due to the on-resistance are typically lower than the losses in the body diode, hence using synchronous switching the overall system efficiency is improved since the power losses in the body diode are replaced by the smaller power losses due to the on-resistance of the MOSFET.

Then, for each switching element pairs controlled synchronously the controller only needs to determine one control signal to control one of the switching elements, because the second switching element in that pair is to be controlled by the opposite signal.

In an embodiment, the controller is arranged to control the first switching element and second switching element based on a same control signal, and to adjust the phase of the control signal to control the second switching element.

In this embodiment as well, the first switching element is in a first switching element pair and coupled to a first phase winding of the brushless motor, and the second switching element is in a second switching element pair and coupled to a second phase winding of the brushless motor. Additionally, the first switching element and the second switching elements are coupled to a respective terminal of the DC power source.

The controller therefore only needs to generate one control signal for controlling both the first and the second switching elements (which are in separate switching element pairs). By adjusting the phase of the control signal driving the second switching element, relative to the phase of the control signal driving the first switching element, the controller can control the width of the pulse of the voltage across the motor windings.

The phase of the control signal may be adjusted, for example by means of a delay.

Such as controller may allow for a reduced complexity, which may be particularly useful for applications having limited processing and/or spatial resources.

In an embodiment, the controller is arranged to alternately switch the first switching element N times and the second switching element M times over a predefined period, N and M being integer numbers, and the controller is arranged to adjust at least one of N and M.

Accordingly, the controller may dynamically adjust the ratio of N and M, therefore determining how the switching losses are distributed on the first and second switching elements.

In an embodiment, the controller is arranged to adjust at least one of N and M based on information indicating an operating condition of at least one of the first switching element and the second switching element.

Accordingly the controller may determine, based on the information indicating its operating condition, that the effect of switching losses in one of the switching element should be reduced, and can therefore decrease the number of times that switching element is switched. Optionally, the information may indicate a temperature of the switching element as an operating condition and/or an internal resistance of the switching element as an operating condition.

Therefore, the controller may, based on the information indicating the temperature of the switching element, determine that the switching element should be switched less frequently, and either decrease the number of times it switches (M or N), and/or increase the number of times the other switching element switches (N or M). As a consequence, the controller may adjust the ratio of N and M, thereby determining to what extend each of the switching elements is to be affected by the switching.

In a second aspect, there is provided a controller for controlling a driver circuit driving a brushless motor in a power tool, the driver circuit being coupled to a direct current (DC) power source (for example a constant DC power source or pulsating DC power source) and including a first switching element pair coupled to a first phase winding of the brushless motor and a second switching element pair coupled to a second phase winding of the brushless motor; and the controller being arranged to alternately switch a first switching element of the first switching element pair and a second switching element of the second switching element pair, wherein the first switching element and the second switching elements are coupled to a respective terminal of the DC power source.

The controller is arranged to generate one or more control signals for controlling the state of the switching elements, so as to drive the motor in accordance with a desired operation.

With the above controller, the first and second switching elements are not switched at the same time, therefore the switching losses occurring in each switching element are limited, and the efficiency of the system is maintained when compared, for example, to an asymmetric switching scheme, or even improved when compared, for example, to a symmetric switching scheme.

Additionally, because the switching elements are switched alternately, or in turn, the switching losses are distributed between the switching elements.

Accordingly, the above controller allows for the power losses to be distributed on switching elements in a half bridge driver circuit and for a desirable overall efficiency to be achieved.

In a third aspect, there is provided a method for controlling a driver circuit driving a brushless motor in a power tool, wherein the driver circuit is coupled to a direct current, DC, power source and includes a first switching element pair coupled to a first phase winding of the brushless motor and a second switching element pair coupled to a second phase winding of the brushless motor. The method comprises alternately switching a first switching element of the first switching element pair and a second switching element of the second switching element pair, wherein the first switching element and the second switching elements are coupled to a respective terminal of the DC power source.

With this method, the switching elements are not switched at the same time, therefore the switching losses occurring in each switching element are reduced, and the method can maintain the efficiency of the system.

Additionally, because the switching elements are switched alternately, or in turn, the method allows for the switching losses to be distributed between the switching elements.

Accordingly, the above method allows for the power losses to be distributed on switching elements in a half bridge driver circuit and for a desirable overall efficiency to be achieved.

In a fourth aspect, there is provided a computer program comprising instructions, which, when executed by a processor, cause the processor to carry out the methods described herein.

A processor as described herein may be any known processor such as a central processing unit (CPU), a microprocessor, capable of executing a computer program stored in memory.

In a fifth aspect, there is provided a non-transitory storage medium storing a computer program comprising instructions which, when executed by a processor, causes the processor to carry out the methods described herein.

The non-transitory storage medium may comprise a non-volatile memory, for example in the form of a read-only-memory (ROM), a programmable ROM (PROM), an erasable or electrically erasable programmable read-only memory (EPROM or EEPROM), flash memory, a magnetic computer storage device (for example a hard disk) or an optical disk, may be pre-loaded with the computer program, so that the computer program may be executed by a processor when the processor is coupled with the non-transitory storage medium.

Alternatively, a computer program product, such as a non-transitory computer-readable storage medium 250 (for example an optical disk such as a CD-ROM, DVD-ROM, etc.) or a computer-readable signal may carry information used to input the computer program to writeable volatile or non-volatile memory, such as random access memory (RAM), from which a processor may execute the computer program.

Hence, the above-described power tools, controllers, methods, computer programs and non-transitory storage mediums, it is possible to provide an electric motor control allowing for the power losses to be distributed on switching elements in a driver circuit and having a desirable overall efficiency whilst operating the motor according to a desired operation.

In embodiments described herein, the controller may be implemented in software, hardware or any combination thereof.

For example, the controller may comprise a processor and a memory comprising computer program instructions. The processor may be coupled to a power source (such as the DC power source) and be arranged to execute the computer program instructions so as to generate control signals at varying voltage levels.

In embodiments and implementations described herein, the controller may have a control signal generator for generating control signals to control the first and second switching elements, so as to alternately switch the first and the second switching elements.

In embodiments and implementations described herein, the switching elements may be transistors, such as Field-effect transistors (FETs) (e.g. Si MOSFETS, GaN MOSFETs, SiC MOSFETs, etc.), Bipolar junction transistors (BJTs), insulated-gate bipolar transistors (IGBTs), thyristors, or other known types of switches.

In embodiments and implementations described herein, the rotor topology of the brushless motor is not limited, and the motor may be a BLDC motor, a switched reluctance motor, or any other brushless motor.

BRIEF DESCRIPTION OF THE FIGURES

In the following, aspects of the present disclosure will be described by reference to the following drawings, by way of example only, in which.

DETAILED DESCRIPTION OF EMBODIMENTS

As briefly described above, FIG. 1 shows a bridge configuration driver circuit 60 connected to a DC power source 40 on one side, and a brushless motor 80 on the other side.

The driver circuit 60 has three pairs of switching elements 62, 64 and 66 connected in parallel to each other. In each pair, one of the switching elements is connected to the '+' terminal of the DC power source 40, namely switching elements 62-1, 64-1 and 66-1, and the other one is connected to the '−' terminal, namely switching elements 62-2, 64-2 and 66-2. The common node of each pair is connected to one of the phase windings of the motor 80.

The DC power source 40 generates a constant DC voltage between its terminals, for powering the phase windings of the brushless motor 80.

Switching elements 62-1, 64-1 and 66-1 are connected in parallel to the + terminal of the DC power source 40, and switching elements 62-2, 64-2 and 66-2 are connected in parallel to the − terminal of the DC power source 40.

The switching element of each pairs 62, 64 and 66 are connected in series, that is, switching elements 62-1 and 62-2 are connected in series, and so are switching elements 64-1 and 64-2, and switching elements 66-1 and 66-2.

In this example, the brushless motor 80 is a BLDC motor. The BLDC motor has a stator with three phase windings 82, 84 and represented with a WYE configuration, and a rotor with permanent magnets forming four rotor poles.

Generally, the number of switching element pairs in the driver circuit 60 correspond to the number of phase windings of the motor 80.

The common nodes of the switching elements pairs 62, 64 and 66 are coupled to one of the phase windings of the BLDC motor. For example, the common node of switching elements 62-1 and 62-2 is coupled to a phase winding of the motor at point A.

Figure 2:
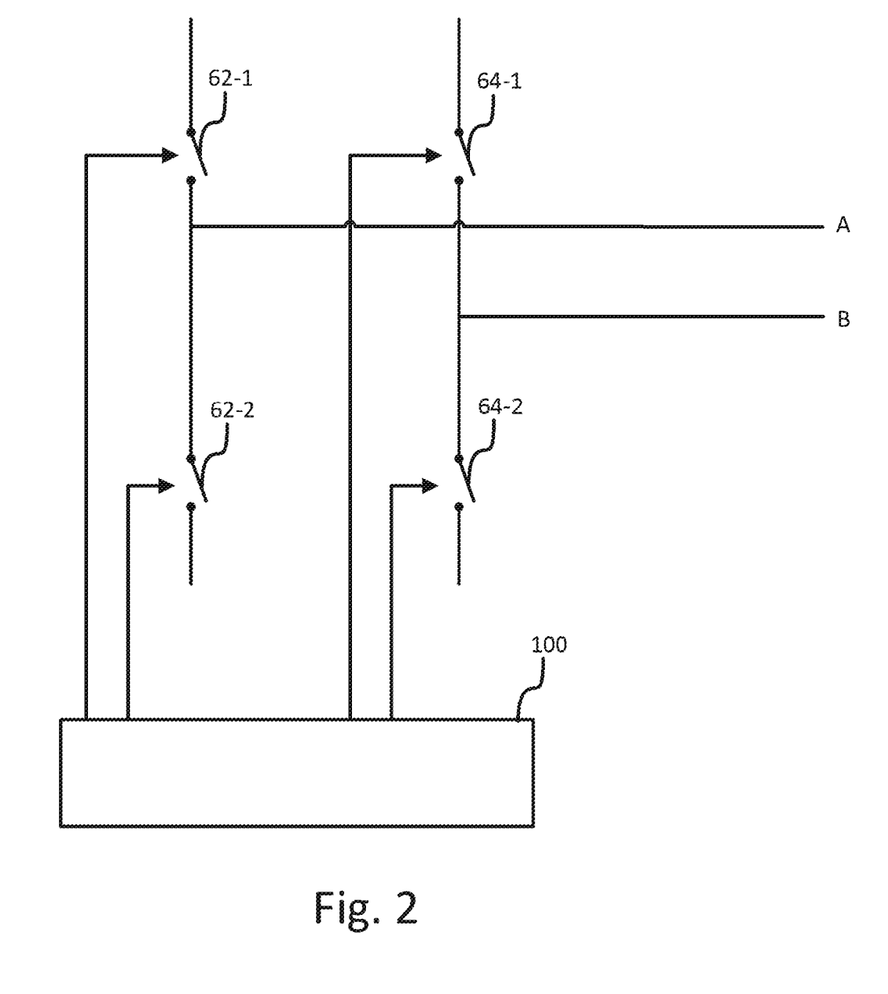
FIG. 2 shows a schematic view of a controller arranged to control the switching elements of a driver circuit according to an embodiment.

As shown on FIG. 2, a controller 100 controls the state of the switching elements pairs 62, 64 and 66 of the driver circuit 60 by generating control signals, so as to provide power to phase windings of the BLDC motor 80.

For example, if the switching elements are transistors having a gate (or a base), the controller 100 is electrically coupled to the gate of each transistor and controls the voltage of the gate with the corresponding control signal.

For clarity, FIG. 2 only shows two switching element pairs of the driver circuit 60, and the DC power source 40 and the BLDC motor 80 are omitted.

Referring to both FIGS. 1 and 2, for example, when the controller 100 controls the switching elements 62-1 and 64-2 to be ON, and keeps the remaining switching elements OFF, a voltage difference Vab is formed between points A and B in the phase windings of the motor. This voltage difference produces a current in the phase windings 82 and 84 of the BLDC motor, which, in turn, generates a magnetic field acting on the magnetic poles of the rotor.

The phase windings of the BLDC motor 80 are powered in succession, thereby rotating the magnetic field generated by the current along the motor axis (that is, the axis along which the rotor is configured to rotate). The rotating magnetic field in the phase windings acts on the magnetic field of the rotor, and the rotor poles rotate so as to align with one of the phase windings being powered.

The period during which a specific phase winding is powered, between two alignments of rotor poles and phase windings, is defined as a commutation period.

More than one phase windings may be powered simultaneously, that is, the commutation periods of different phases may partially overlap, for example to reduce the torque ripple leading to a smoother rotation of the motor 80.

When a new alignment occurs, new phase windings are powered, that is, the controller alternately switches a new set of switching elements (for example switching element 64-1 and 66-2) in the same way. In some cases, the same switching element may be part of the set being alternately switched before and after an alignment. For example, the controller may be arranged to turn on switching elements 62-1 and 64-2 before an alignment, and switching elements 62-1 and 66-2 after the alignment.

The succession in which the phase windings are to be powered would be apparent to a skilled person, based on the configuration of the BLDC motor 80 and the desired operation of the BLDC motor, such as a clockwise or anti-clockwise rotation of the rotor, a desired speed or acceleration of the rotor, etc.

There are many known methods of determining the rotor angle, such as Hall sensors placed on the rotor or by measuring the produced Back EMF, which allows for the controller to determine when the phase winding(s) being powered should change.

Figure 3:
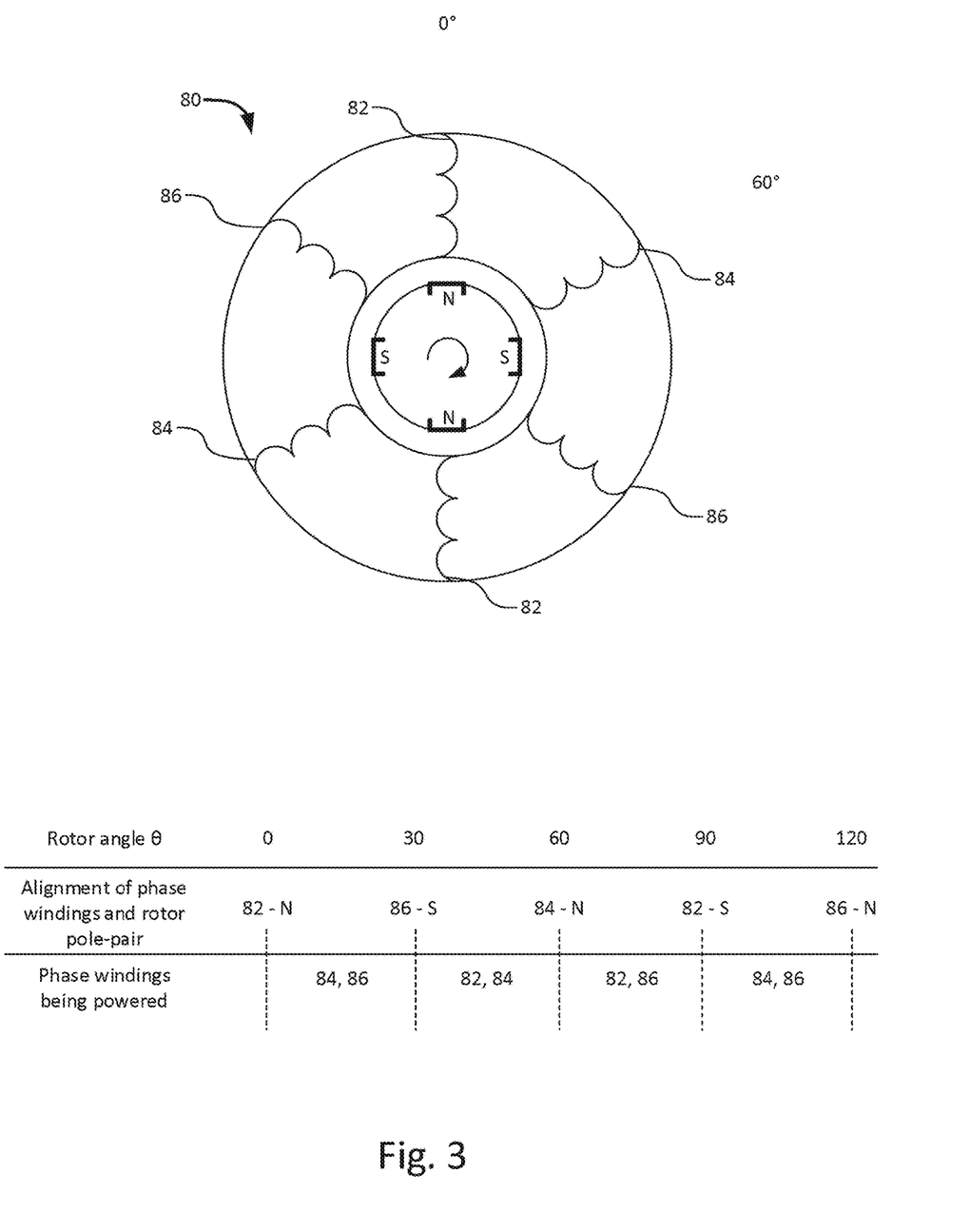
FIG. 3 shows a schematic representation of the motor and an exemplary succession of phase windings being powered.

FIG. 3 shows a schematic representation of the BLDC motor 80 having phase windings 82, 84 and 86, and a rotor having two rotor pole-pairs (four rotor poles in total) indicated by an 'N and an 'S'. FIG. 3 also shows an exemplary succession of phase windings being powered to obtain a clockwise rotation of the rotor of BLDC motor 80, based on the rotor angle θ. For the following explanation, the rotor angle θ is defined as starting from (i.e. rotor angle=0°) when phase winding 82 and the rotor pole-pair 'N' are aligned.

Starting at a rotor angle θ=0°, the rotor rotates clockwise, therefore, the phase winding 86 and rotor pole-pair 'S' will be the next ones aligned, at a rotor angle θ of 30°. While the rotor angle θ is between 0° and 30°, phase windings 84 and 86 are powered, so as to generate a repulsive force between phase winding 84 and the rotor pole-pair 'S', and an attractive force between phase winding 86 and the rotor pole-pair 'S'. These generated forces assist the rotor's clockwise rotation.

Similarly, while the rotor angle θ is between 30° and 60°, phase windings 82 and 84 are powered, so as to generate a repulsive force between phase winding 82 and the rotor pole-pair 'N', and an attractive force between phase windings 84 and the rotor pole-pair 'N', and so on.

Embodiment 1

Figure 4:
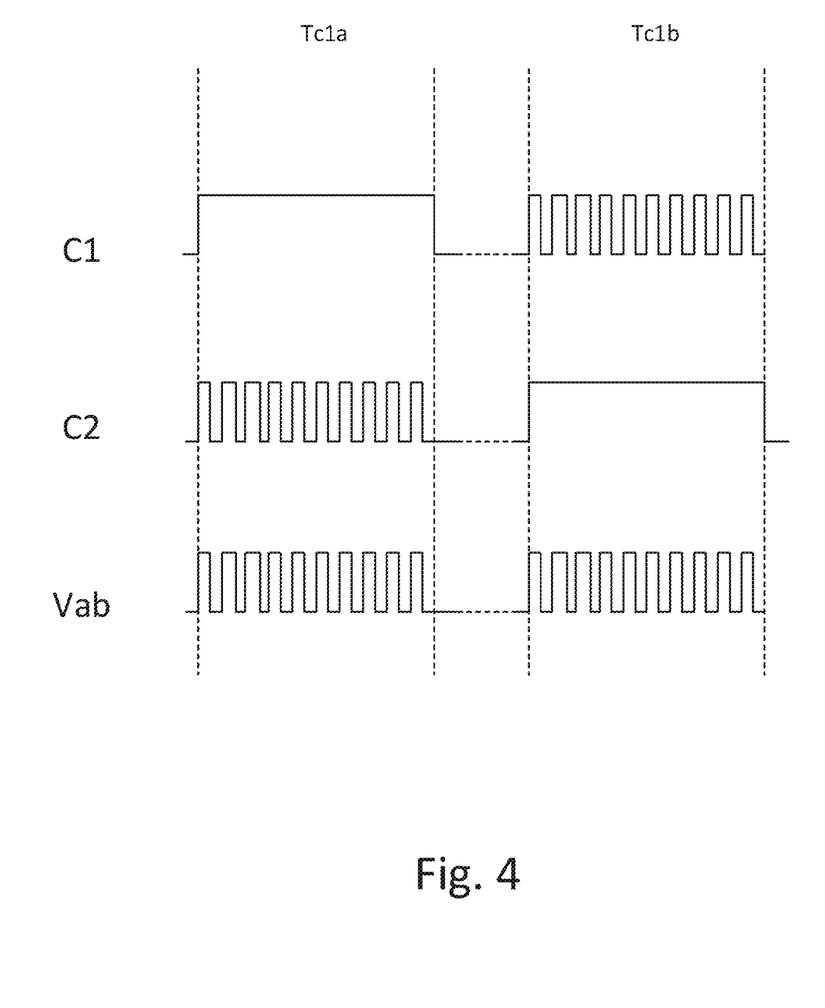
FIG. 4 shows a schematic representation of control signals for controlling switching elements and the voltage obtained between two points in the phase windings of the motor according to an embodiment.

FIG. 4 shows the control signals C1 and C2 generated by the controller 100 for controlling switching elements to be alternately switched, according to an embodiment.

In the present embodiment, switching elements are metal-oxide FETs, MOSFETs, and the controller 100 is electrically coupled to the gate electrode of each MOSFET. Controller 100 generates control signal C1 for controlling MOSFET 62-1 and control signal C2 is for controlling MOSFET 64-2.

Referring back to FIG. 3, these control signals may, for example, be generated while the rotor angle is between 30° and 60°, and phase windings 82 and 84 are powered. Controller 100 also generates control signals for controlling the remaining switching elements of the driver circuit 60, but the representation of these control signals is omitted for simplicity.

FIG. 4 also shows the voltage Vab obtained between points A and B in the phase windings of the motor 80, based on the state of MOSFETs 62-1 and 64-2.

In the schematic representations on FIG. 4, control signals C1 and C2 are shown to be either at a relatively low value or at a relatively high value. At the low value the control signal causes the controlled MOSFET to be OFF, while at the high value the control signal causes the controlled MOSFET to be ON. These relatively low and high values are determined based on the characteristics of the MOSFET, the DC power source 40 and/or the BLDC motor 80, as well as the relative voltages between the terminals of the MOSFETs. For simplicity, the representations omit any voltage differences between the two control signals which occur due to different biases being normally applied to each control signal. It would be apparent to the skilled person that different voltage biases may be achieved by driving at least one of the MOSFETs with a floating voltage supply. As such, the low and high values for MOSFETs connected to one DC power source terminal need not be the same as the low and high values for MOSFETs connected to the other DC power source terminal.

In the present embodiment, for example, the DC power source 40 generates a voltage of 48 V between its terminals. The control signal C1 has a high value which is 12 V higher than its low value, and similarly, the control signal C2 has a high value which is 12 V higher than its low value. For example, if control signal C1 is floating, the circuit generating control signal C1 could be biased at, for example, 24V, such that the low value of C1 would be 24V and the high value of control voltage C1 would be 36V, while control signal C2 could be biased at 0.5V such that it would have a low value around 0.5V and a high value around 12.5V. The low and high values of the control signals provided here are merely illustrative.

In this embodiment, the controller 100 is arranged to alternately switch MOSFET 62-1 and MOSFET 64-2, via the generated control signals C1 and C2.

During a first commutation period Tc1$a$, the control signal C1 controlling MOSFET 62-1 is constant at a relatively high value so as to keeps MOSFET 62-1 ON, and the control signal C2 controlling MOSFET 64-2 is a PWM signal having a fundamental frequency defined as the switching frequency f_sw, so as to turn MOSFET 64-2 ON only for a portion of each switching period.

The pulse width of control signal C2 is modulated during commutation period Tc1$a$ based on a reference signal and the current level in the phase windings so as to obtain the desired current level in the phase windings.

During a second commutation period Tc1$b$, the control signal C2 is constant at a relatively high value so as to keep MOSFET 64-2 ON, and the control signal C1 is a PWM signal having the switching frequency as a fundamental frequency. During commutation period Tc1$b$, the pulse width of control signal C2 is modulated based on a reference signal and the current level in the phase windings so as to obtain the desired current level in the phase windings.

During commutation periods Tc1$a$ and Tc1$b$, the control signals generated by the controller for controlling MOSFET 62-2 and 64-1, which are in the same switching element pair as MOSFET 62-1 and 64-2, respectively, are constant signals at a low value so as to keep MOSFETs 62-2 and 64-1 OFF.

The voltage Vab pulses between a high value (that is, relatively higher than the low value) when both MOSFETs 62-1 and 64-2 are turned ON, and a low value when either MOSFET is turned OFF. The high voltage is based on the voltage of the DC power source, taking into account any voltage drop across the switching elements (MOSFETs) which are ON, and other components of the circuit, etc.

As apparent from FIG. 4, during the commutation period Tc1a, each rising edge and subsequent falling edge of the control signal C1 (controlling MOSFET 62-1) leads to a pulse in the voltage Vab. Similarly, during commutation period Tc1b, each rising edge and subsequent falling edge of the control signal C2 (controlling MOSFET 64-2) leads to a pulse in the voltage Vab.

In this embodiment, MOSFET 62-1 incurs higher switching losses during commutation period Tc1a, and MOSFET 64-2 incurs higher switching losses during commutation period Tc1b. When considering both commutation periods Tc1a and Tc1b, however, the switching losses are distributed over both MOSFETs 62-1 and 64-2.

Embodiment 2

Figure 5:
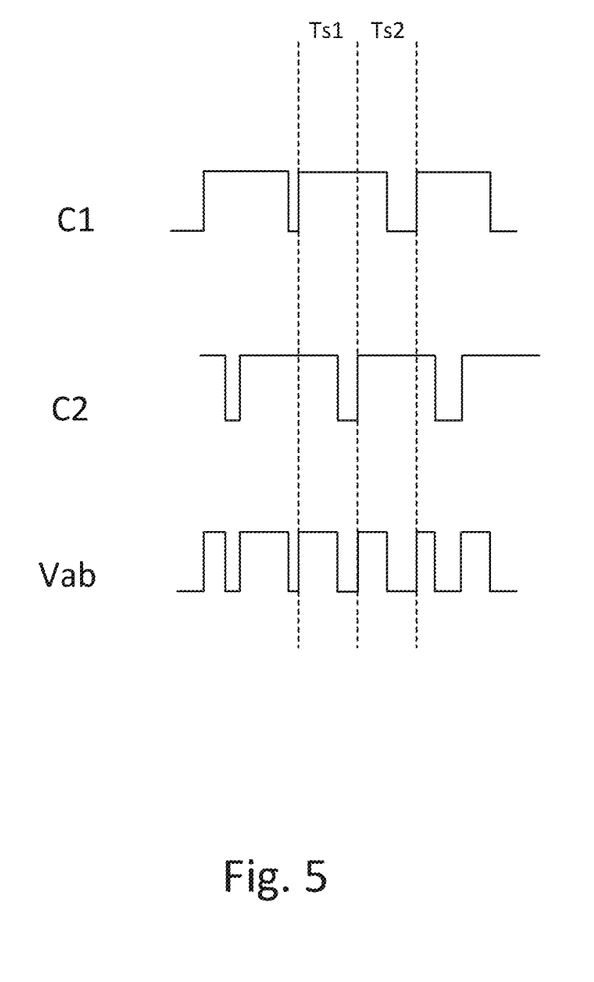
FIG. 5 shows a schematic representation of control signals for controlling switching elements and the voltage obtained between two points in the phase windings of the motor according to an embodiment.

FIG. 5 shows control signals C1 and C2 generated by the controller 100 for controlling switching elements 62-1 and 64-2 so as to alternately switch switching elements 62-1 and 64-2 during the same switching period, according to an embodiment.

More specifically, switching elements 62-1 and 64-2 are turned ON during a commutation period of the motor FIG. 5 also shows the voltage Vab obtained between points A and B in the phase windings of the motor 80.

For example, switching element 62-1 is turned ON at the start of a switching period Ts1 and switching element 64-2 is turned OFF near a central point of switching period Ts1. Then, switching element 64-2 is turned ON at the start point of the switching period Ts2 following Ts1, and switching element 62-1 is turned OFF near a central point of switching period Ts2.

The control signals C1 and C2 allow for a pulsing voltage Vab to be obtained, each pulse of voltage Vab being between a rising edge of one of the control signals C1 and C2, and a subsequent falling edge of the other one of the control signals C1 and C2.

As with the previously described embodiment, a PWM signal is used to control at least one of the control signals, thereby allowing the pulse width of the voltage Vab to be modulated (and therefore the current level in the phase windings to be controlled).

In this embodiment switching elements 62-1 and 64-2 are switched alternately and only once (either ON or OFF) during each switching period.

Accordingly, the switching losses are distributed between switching elements 62-1 and 64-2, and the number of switching is lower than previously described embodiment, leading to lower total switching losses.

Additionally, the effective switching frequency of the switching elements is substantially half the switching frequency f_sw, and the emitted energy caused by switching the switching elements 62-1 and 64-2 has a frequency lower than the switching frequency.

During the switching periods, the controller 100 also generates control signals for controlling switching elements 62-2 and 64-2. These control signals may either be constant signals at a relatively low value so as to keep switching elements 62-2 and 64-1 OFF. Alternatively, switching element 62-2 may be controlled by a control signal which is the opposite of control signal C1, and/or switching element 64-1 may be controlled by a control signal which is the opposite of control signal C2 for controlling switching element 64-2.

Figure 6A:
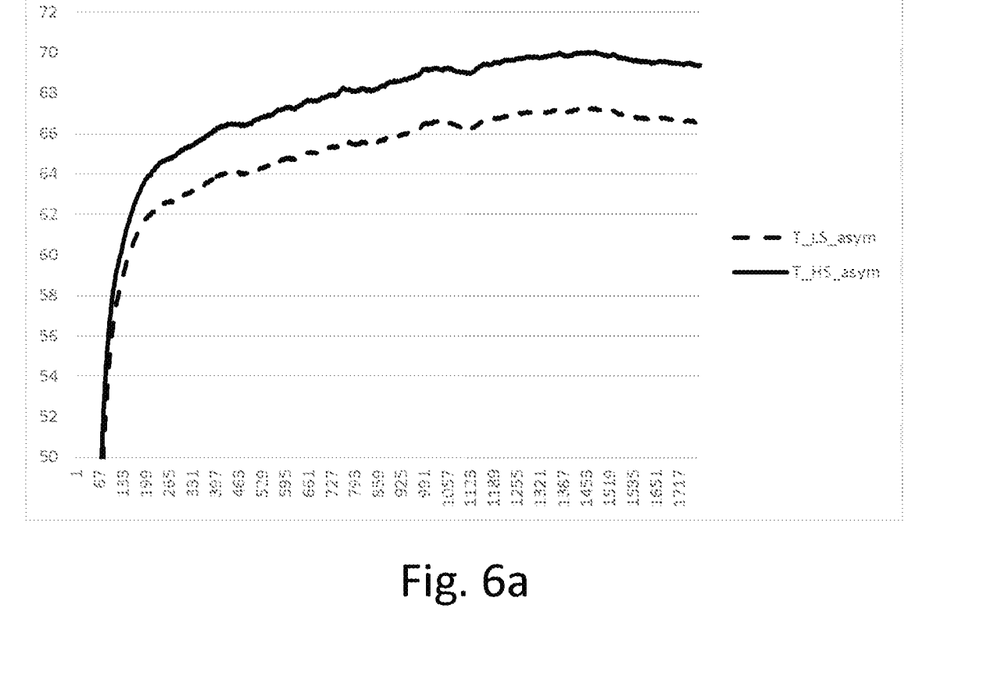
FIGS. 6a and 6b show the effect of the controller according to an embodiment in terms of the thermal performance of the switching elements.
Figure 6B:
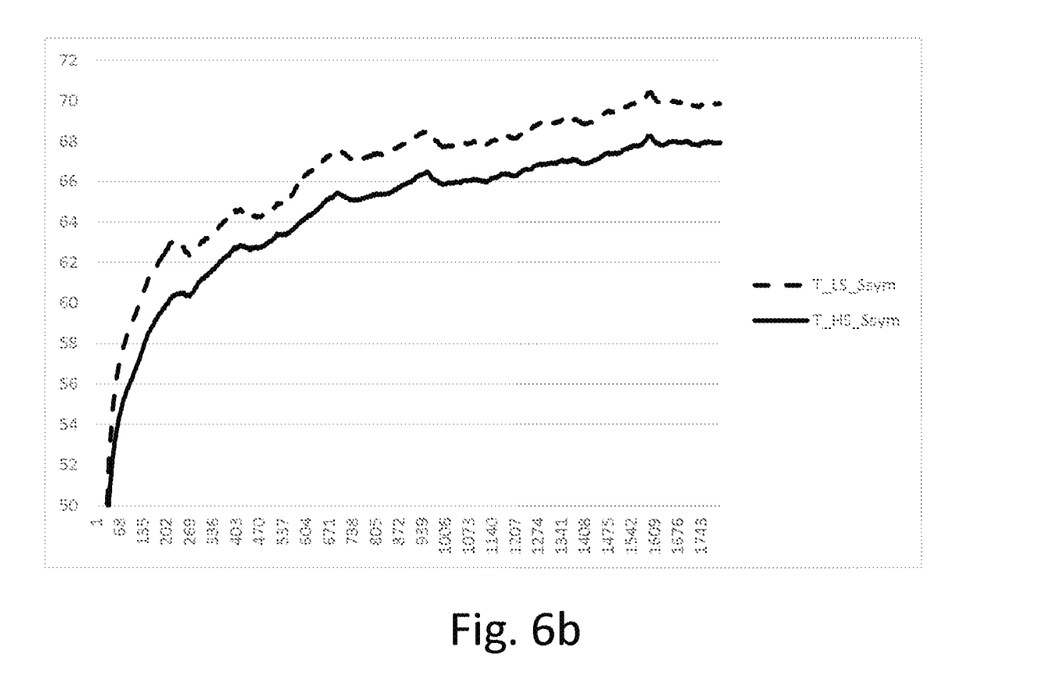

FIGS. 6a and 6b show some of the effects of controller 100 according to the present embodiment in terms of the thermal performance of the switching elements.

More specifically, FIG. 6a shows the temperature of switching elements 62-1 and 64-2 over time when controlled with conventional asymmetric switching. On the other hand, FIG. 6b shows the temperature of switching elements 62-1 and 64-2 over time with controller 100 according to the present embodiment.

In the asymmetric switching shown on FIG. 6a, switching element 62-1, which is connected to the positive terminal of the power source, has a higher temperature than switching element 64-2, indicating that switching element 62-1 incurs higher thermal losses. On the other hand, in the semi-symmetric switching shown on FIG. 6b, the temperature of switching element 62-1 is lower than that of switching element 64-2. Therefore, it becomes apparent from this that semi-symmetric switching can be utilised to affect how thermal losses are spread on the switching elements.

A comparison of the figures also shows that the temperature difference between switching elements appears larger in FIG. 6a (approximately 3° C.) than the temperature difference in FIG. 6b (approximately 2° C.). Thus, the controller according to the present embodiment more equally distributes the thermal effect of switching than asymmetric switching.

Embodiment 3

Figure 7A:
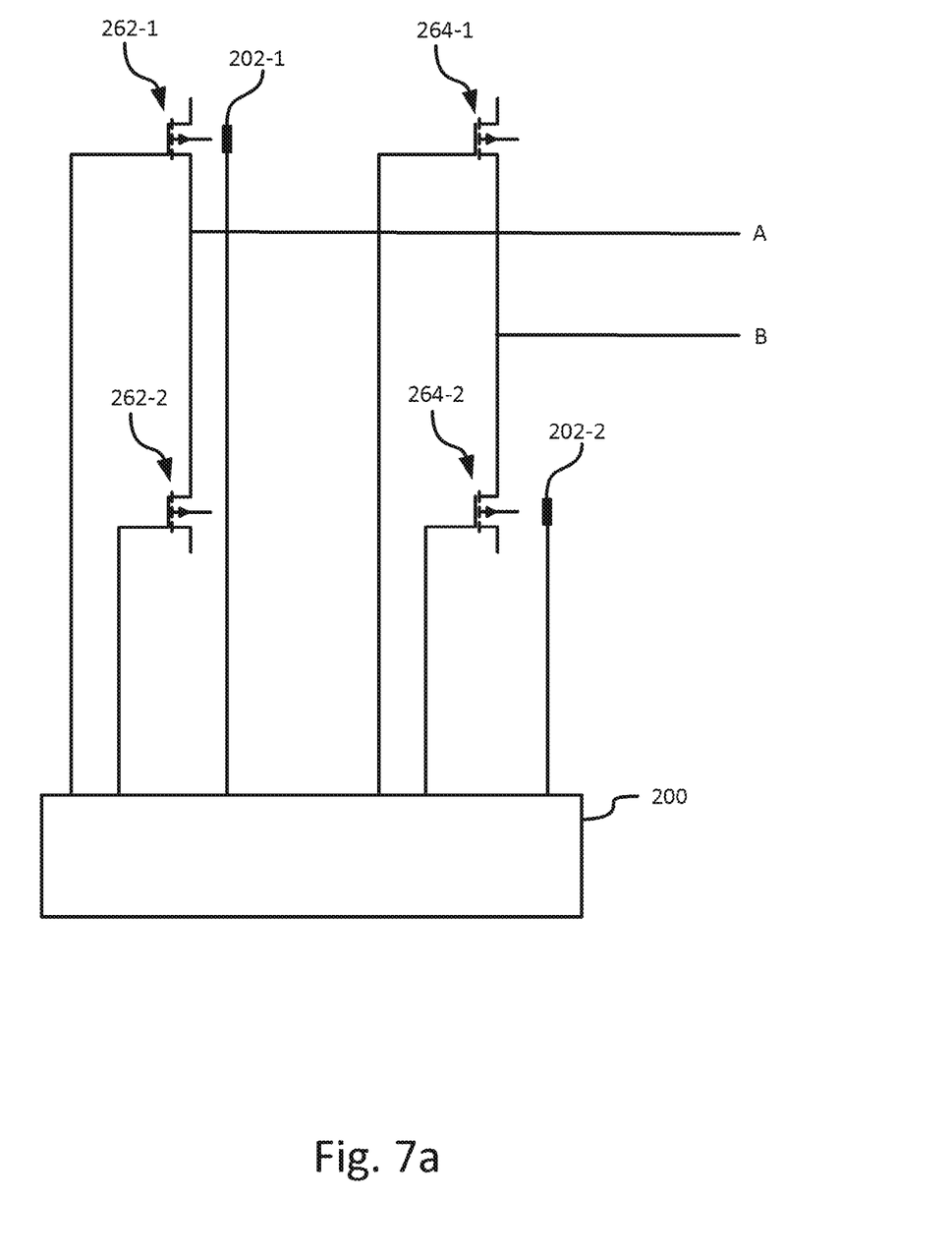
FIG. 7a shows a schematic representation of a controller arranged to control the switching elements of a driver circuit according to an embodiment.
Figure 7B:
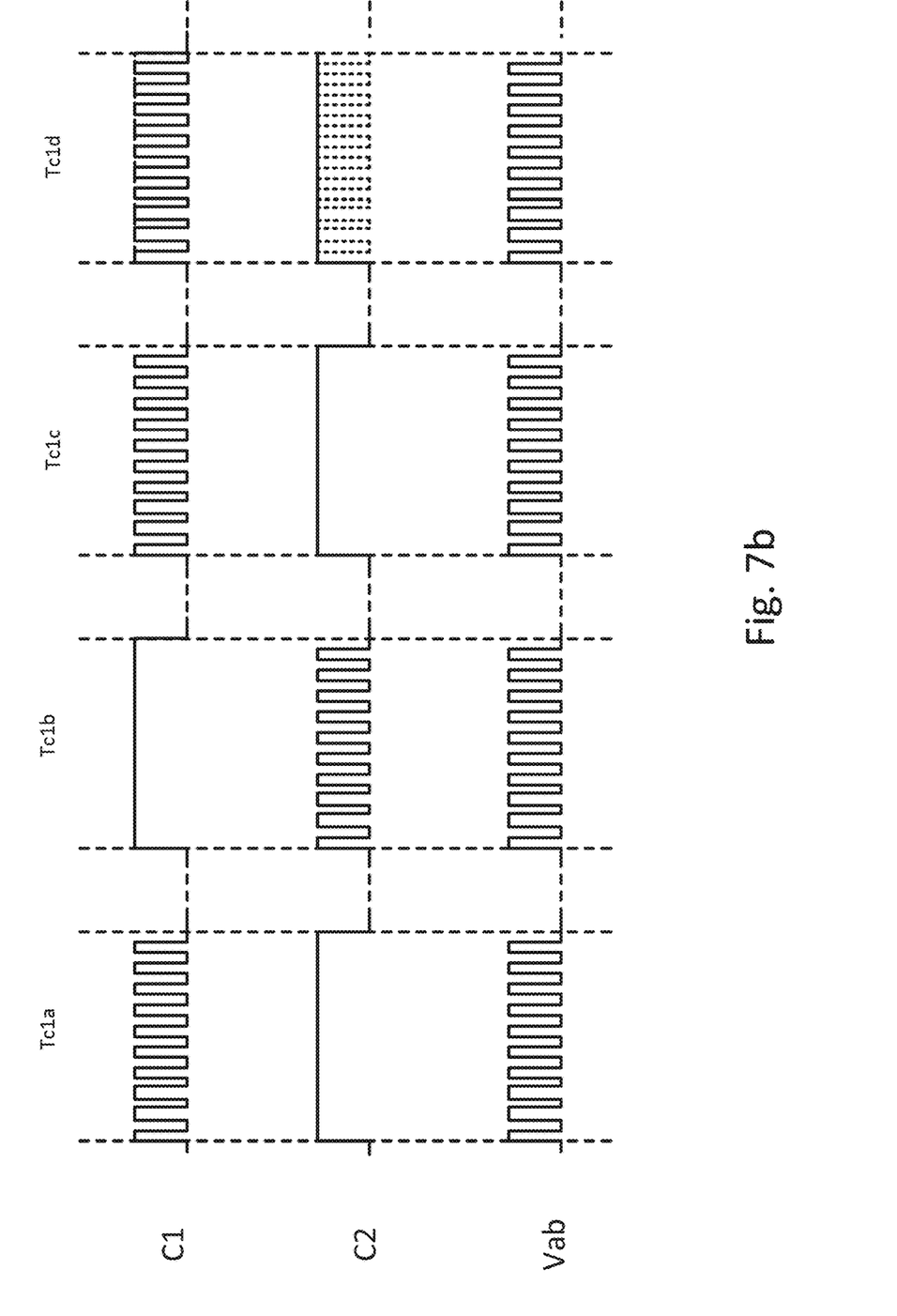
FIG. 7b shows a schematic representation of control signals for controlling switching elements according to an embodiment.
Figure 7C:
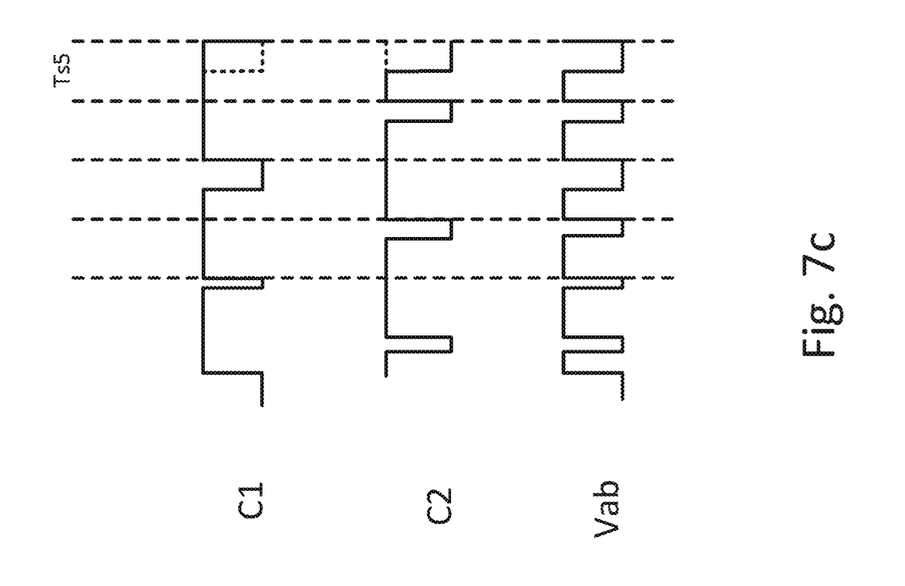
FIG. 7c shows a schematic representation of control signals for controlling switching elements according to an embodiment.

Referring now to FIGS. 7a to 7c, an embodiment will be described.

FIG. 7a shows a controller 200 and two switching element pairs 62 and 64 of driver circuit 60.

In the present embodiment, driver circuit 260 includes MOSFETs as switching elements. MOSFETs 262-1 and 62-2 of the first MOSFET pair 262, and MOSFET 264-2 of the second MOSFET pair 264 are each provided with a sensor 202-1 to 202-3, to obtain information indicating a state of the corresponding MOSFET.

In this embodiment, sensor 202-1 and 202-2 are arranged to obtain information indicating a temperature of MOSFET 262-1 and 264-2, respectively.

The controller 200 is arranged to obtain information indicating a state of an MOSFET from at least one of sensors 202-1 or 202-2.

Based on the obtained information, the controller 200 may determine that one of MOSFET 262-1 and MOSFET 264-2 is affected by the switching distinctively more than the other switching element. The controller may determine to switch the MOSFET that is less affected by the switching more than the other one, so as to reduce the difference in how the MOSFETs are affected by the switching.

In this embodiment, the controller 200 is arranged to alternately switch the MOSFET 262-1 N times and the MOSFET 264-2 M times over a predetermined period, N and M being positive integer numbers. The predetermined period may be any arbitrarily set period, which may correspond to a number of switching periods, or a number of commutation periods of the motor.

Initially, N and M are both set to 1. During operation of the motor, the controller may determine that MOSFET 262-1 is affected by the switching more than MOSFET 264-2. In this case, the next time MOSFET 262-1 is to be switched, controller 200 may control MOSFET 264-2 to switch instead. That is, controller 200 sets M to 2, which causes MOSFET 264-2 to be switched 2 times each time MOSFET 262-1 is switched.

The presently described controller 200 may be combined with any of the embodiments described above.

For example, in embodiments where one of the switching elements is kept ON during a commutation period while the other one is controlled with a PWM signal, the controller may control the switching element 262-1 which is more affected by the switching to be kept ON during two commutation periods (i.e. by setting N or M to 2), and to control the other switching element less affected by the switching to be kept ON during only one commutation period (i.e. by keeping the other one of N or M at 1).

FIG. 7b shows the control signals C1 and C2 for controlling MOSFETs 262-1 and 264-2 during four commutation periods, to alternately turn them ON according to an embodiment. For simplicity, FIG. 7b only indicates for each commutation period if each control signal is a PWM signal (indicated by 'PWM') or a constant signal at a high value so as to keep the corresponding MOSFET ON (indicated by 'ON'). As shown with discontinuous lines, commutation periods Tc1a to Tc1d are not consecutive periods, and are separated by intermediate commutation periods during which remaining MOSFETs of the driver circuit 260 (e.g. MOSFETs 262-2 and 264-1) would be driven.

Initially, during the first and third commutation periods Tc1a and Tc1c, control signal C1 for controlling MOSFET 262-1 is to be a PWM signal during the first and the third commutation periods and control signal C2 is to be a constant signal at a relatively high value to keep MOSFET 264-2 ON. On the other hand, during the second and fourth commutation periods Tc1b and Tc1d, control signal C1 is to be a constant signal at a relatively high value so as to keep MOSFET 262-1 ON and control signal C2 is to be a PWM signal.

In the example of FIG. 7b, controller 200 obtains information from sensor 202-2 indicating a state of MOSFET 264-2, and determines that MOSFET 264-2 is affected by the switching more than MOSFET 262-1, for example because the on/off ratio of MOSFET 264-2 falls below a predetermined threshold. Based on this information, in the fourth commutation period, control signal C1 is generated as a PWM signal instead, and control signal C2 is a constant control signal at a relatively high value.

FIG. 7c shows control signals C1 and C2 for controlling MOSFETS 262-1 and 264-2 according to an embodiment, in which both switching elements are controlled with PWM signals and controller 200 is arranged to obtain information indicating a state of an MOSFET from at least one of sensors 202-1 or 202-2, and to adjust the number of times one of the MOSFETs is to be switched over a predetermined period.

In this embodiment, controller 200 obtains information from sensor 202-1 indicating a temperature of MOSFET 262-1 and information from sensor 202-2 indicating a temperature of MOSFET 264-2, and determines that MOSFET 262-1 is affected by the switching more than MOSFET 264-2, for example because the temperature of MOSFET 262-1 is higher than a predetermined threshold, or based on a comparison of the temperatures of MOSFETs 262-1 and 264-2.

Accordingly, in a switching period Ts5 where MOSFET 262-1 is initially scheduled to be switched (as shown with dashed lines), controller 200 switches MOSFET 264-2 instead of MOSFET 262-1, to avoid MOSFET 262-1 from being further affected by the switching.

Modifications and Variations

Although the above explanation is considered to fully clarify how the present disclosure may straightforwardly be put into effect by those skilled in the art, it is to be regarded as purely exemplary.

Any controller 100 or 200 described herein may be used in a power tool, such as a sander, a vacuum cleaner, a benchtop saw etc., and the controller may be coupled to a driver circuit driving a BLDC motor, and more specifically to each switching element of the driver circuit so as to control their state (either ON or OFF). In some cases, the power tools may be hand-held or portable.

In embodiments described herein, the DC power source provides a constant DC voltage across its terminals. Alternatively, the DC power source may be a power source providing a pulsating DC voltage.

In some embodiments, the brushless motor is described as a BLDC motor. Alternatively, the brushless motor may be a switched reluctance motor, or any other type of brushless motor.

Although, the motor 80 is described as comprising three phase windings and a rotor having permanent magnets and four rotor poles, it would be understood by the person skilled in the art that embodiments described in the present disclosure may equally be used with motors having other configurations, for example motors having a different number of phase windings and/or a different number of rotor poles. Similarly, the WYE representation of the phase windings is illustrative, and the phase windings may also be described with a delta configuration instead.

In some embodiments described herein, the controller 100 and/or controller 200 may comprise a control signal generator configured to generate control signals for controlling the switching elements. For example, in the embodiment described with reference to FIG. 5, the controller 100 may comprise a control signal generator 120 (not shown) which is configured to generate a first control signal for controlling switching element 62-1, a second control signal for controlling switching element 62-2, a third control signal for controlling switching element 64-1 and so on for each switching element of the driver circuit.

In the embodiment described with reference to FIG. 4, the control signals for controlling switching elements 62-1 and 64-2 are described as being constant signals at a relatively low value so as to keep MOSFETs 62-2 and 64-1 OFF during commutation periods Tc1a and Tc1b. Alternatively, during commutation period Tc1a, the controller may be arranged to control the MOSFETs 64-1 and 64-2 in MOSFET pair 64 synchronously, that is, control signal for controlling MOSFET 64-1 may be a PWM signal which is the opposite of control signal C2 for controlling MOSFET 64-2, such that at any time during commutation period Tc1a, one MOSFET of the MOSFET pair is ON and the other one is OFF. Similarly, during commutation period Tc1b, the controller may control MOSFET pair 62 synchronously, by generating a control signal for controlling MOSFET 62-2 which is the opposite of control signal C1 for controlling MOSFET 62-1.

In the embodiment described with reference to FIG. 5, switching elements are described as being turned ON at a start point of a switching period or turned OFF near a central point of a switching period. Alternatively, the controller 100 may be arranged to control switching elements by alternately turning ON one of the switching elements near a central point of a switching period, and turn OFF the other switching element at the end point of the corresponding switching period, in which case the PWM control may be used to determine when in the switching period the switching element should be turned ON. In other words, the rising edge of the control signals need not be located at the beginning of the switching period but may be located near a central point (depending on the duty cycle determined for that control signal in that switching period), while the falling edge would correspond with the end of the switching period. In that case, the controlled switching element would be turned OFF for $(1-D)*Ts$, where D is the duty cycle specific to the control signal and the switching period, and Ts is the duration of a switching period. The switching element would then be turned ON for $D*Ts$ until the end of the switching period.

In some embodiments described herein, the information indicating an operating condition indicates a temperature of the switching element. However, the information may alternatively or additionally indicate an internal resistance of the switching element, or any other information which characterises an operating condition of the switching element.

In embodiments described with reference to FIGS. 7a-7c, the controller is described as setting the value of M, the number of times MOSFET 264-2 is switched over a the predetermined period. More generally, however, the controller may be arranged to adjust at least one of N and M to control the ratio of N and M, for example by adjusting N while M is constant, or adjusting both N and M.

In embodiments described herein, control signals are defined as PWM signals. However, the control signals may be any other type of pulsing signal, such as a pulse-frequency modulating signal (PFM).

In embodiments described herein, control signals for controlling switching elements 62-1 and 64-2 are described. These switching elements are used merely to illustrate embodiments, and other switching elements of the driver circuit may be controlled in a similar fashion. For example, switching elements 66-2 and 64-1, or switching elements 62-2 and 66-1, may be the first switching element and the second switching element described herein, instead of switching elements 62-1 and 64-2.

In some embodiments described herein, the switching elements are described as MOSFETs, however, it would be apparent that any of the switching elements may instead be of any other switching element type, such as an IGBT.

All of the above are is fully in the scope of the disclosure, and are considered to form the basis for alternative embodiments in which one or more combinations of the above-described features are applied, without limitation to the specific combinations disclosed above.

In light of this, there will be many alternatives which implement the teaching of the present disclosure. It is expected that one skilled in the art will be able to modify and adapt the above disclosure to suit their own circumstances and requirements within the scope of the present disclosure, while retaining some or all technical effects of the same, either disclosed or derivable from the above, in light of his common general knowledge in this art. All such equivalent modifications or adaptations fall within the scope of the present invention as defined by the appended claims.

The invention claimed is:

1. A power tool with a direct current, DC, power source, a driver circuit and a brushless motor, the power tool comprising a controller, wherein the driver circuit is coupled to the DC power source and includes a first switching element pair coupled to a first phase winding of the brushless motor and a second switching element pair coupled to a second phase winding of the brushless motor, and the controller is arranged to alternately switch a first switching element of the first switching element pair and a second switching element of the second switching element pair, wherein the first switching element and the second switching element are coupled to respective terminals of the DC power source, wherein the controller is arranged to:

keep the first switching element ON during a first switching period of the brushless motor and to control the second switching element with a pulsing signal, and keep the second switching element ON during a second switching period of the brushless motor and control the first switching element with a pulsing signal.

2. The power tool of claim 1, wherein the controller is arranged to alternately switch the first switching element and the second switching element during a same switching period of the brushless motor.

3. The power tool of claim 1, wherein the controller is arranged to control the switching elements in at least one of the switching element pairs synchronously.

4. The power tool of claim 1, wherein the controller is arranged to control the first switching element and the second switching element based on a same control signal, and to adjust the phase of the control signal to control the second switching element.

5. A controller for controlling a driver circuit driving a brushless motor in a power tool, the driver circuit being coupled to a direct current, DC, power source and including a first switching element pair coupled to a first phase winding of the brushless motor and a second switching element pair coupled to a second phase winding of the brushless motor; and the controller being arranged to alternately switch a first switching element of the first switching element pair and a second switching element of the second switching element pair, wherein the first switching element and the second switching element are coupled to respective terminals of the DC power source, wherein the controller is arranged to:

keep the first switching element ON during a first switching period of the brushless motor and to control the second switching element with a pulsing signal, and keep the second switching element ON during a second switching period of the brushless motor and control the first switching element with a pulsing signal.

6. The controller of claim 5, wherein the controller is arranged to alternately switch the first switching element and the second switching element during a same switching period of the brushless motor.

7. The controller of claim 5, further arranged to control the switching elements in at least one of the switching element pairs synchronously.

8. The controller of claim 5, wherein the controller is arranged to control the first switching element and the second switching element based on a same control signal, and to adjust the phase of the control signal to control the second switching element.

9. A controller for controlling a driver circuit driving a brushless motor in a power tool, the driver circuit being coupled to a direct current, DC, power source and including a first switching element pair coupled to a first phase winding of the brushless motor and a second switching element pair coupled to a second phase winding of the brushless motor; and the controller being arranged to alternately switch a first switching element of the first switching element pair and a second switching element of the second switching element pair, wherein the first switching element and the second switching element are coupled to respective terminals of the DC power source, arranged to alternately switch the first switching element N times and the second switching element M times over a predefined period, wherein N and M are integer numbers, and the controller being arranged to adjust at least one of N and M.

10. The controller of claim 9, wherein the controller is arranged to adjust the ratio of N and M based on information indicating an operating condition of at least one of the first switching element and the second switching element, optionally, the information indicating a temperature of the switching element.

11. A method of controlling a driver circuit driving a brushless motor in a power tool, wherein the driver circuit is coupled to a direct current, DC, power source and includes a first switching element pair coupled to a first phase winding of the brushless motor and a second switching element pair coupled to a second phase winding of the brushless motor, the method comprising alternately switching a first switching element of the first switching element pair and a second switching element of the second switching element pair, wherein the first switching element and the second switching element are coupled to respective terminals of the DC power source, wherein the switching includes:

keeping the first switching element ON during a first switching period of the brushless motor and controlling the second switching element with a pulsing signal, and keeping the second switching element ON during a second switching period of the brushless motor and controlling the first switching element with a pulsing signal.

* * * * *